(12) United States Patent
Ying et al.

(10) Patent No.: US 10,211,924 B2
(45) Date of Patent: Feb. 19, 2019

(54) OPTICAL TRANSMISSION DEVICE AND OPTICAL TRANSCEIVER MODULE

(71) Applicant: VIA TECHNOLOGIES, INC., New Taipei (TW)

(72) Inventors: Cheng-Ming Ying, New Taipei (TW); Yu-Lung Lin, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 63 days.

(21) Appl. No.: 14/592,198

(22) Filed: Jan. 8, 2015

(65) Prior Publication Data

US 2015/0207568 A1 Jul. 23, 2015

Related U.S. Application Data

(60) Provisional application No. 61/930,596, filed on Jan. 23, 2014.

(30) Foreign Application Priority Data

Dec. 9, 2014 (TW) .............................. 103142738 A (51) Int. Cl.
*H04B 10/40* (2013.01)
*H04B 10/80* (2013.01)
*G02B 6/42* (2006.01)

(52) U.S. Cl.
CPC ........... *H04B 10/40* (2013.01); *H04B 10/801* (2013.01); *G02B 6/4246* (2013.01)

(58) Field of Classification Search
CPC ..... G02B 6/4246; H04B 10/40; H04B 10/801
USPC ........................................................ 398/135
See application file for complete search history.

(56) References Cited

U.S. PATENT DOCUMENTS

| 8,666,255 B2 * | 3/2014 | Huang | H04B 10/0795 398/135 |
| 2007/0166041 A1 * | 7/2007 | Le | H04B 10/801 398/135 |
| 2008/0159756 A1 * | 7/2008 | Cheng | H03F 1/0277 398/210 |

(Continued)

FOREIGN PATENT DOCUMENTS

CN            102546000            7/2012

OTHER PUBLICATIONS

European Search Report dated Nov. 13, 2015, issued in application No. EP 15151817.2-1860.

(Continued)

*Primary Examiner* — David C Payne
*Assistant Examiner* — Omar S Ismail
(74) *Attorney, Agent, or Firm* — McClure, Qualey & Rodack, LLP (57) ABSTRACT

An optical transmission device is provided. The optical transmission device is coupled between a first electronic device and a second electronic device, and includes a first optical transceiver module coupled to the first electronic device; a second optical transceiver module coupled to the second electronic device; and first and second optical fibers coupled between the first optical transceiver module and the second optical transceiver module, wherein the second optical transceiver module transmits an optical signal to the first optical transceiver module periodically when the second electronic device is idle for a first predetermined period.

22 Claims, 8 Drawing Sheets

(56) References Cited

U.S. PATENT DOCUMENTS

| | | |
|---|---|---|
| 2012/0019197 A1 | 1/2012 | Lee et al. |
| 2012/0045202 A1 | 2/2012 | Jiang et al. |
| 2012/0141064 A1 | 6/2012 | Walker |
| 2012/0170927 A1* | 7/2012 | Huang ............... H04B 10/0795 398/20 |
| 2012/0191997 A1* | 7/2012 | Miller ....................... G06F 1/32 713/323 |
| 2012/0317446 A1 | 12/2012 | Jaramillo |
| 2013/0129346 A1 | 5/2013 | Zbinden et al. |
| 2013/0129359 A1* | 5/2013 | Zbinden ............. H04B 10/2503 398/135 |
| 2013/0176401 A1* | 7/2013 | Monari ................ H04N 5/2252 348/47 |
| 2013/0236188 A1 | 9/2013 | Hung et al. |
| 2014/0156879 A1* | 6/2014 | Wong ................. G06F 11/3027 710/19 |
| 2016/0020912 A1* | 1/2016 | Charbonneau-Lefort ................... H04L 12/12 398/139 |

OTHER PUBLICATIONS

Chinese language office action dated Dec. 29, 2015, issued in application No. TW 103142738.
European Search Report dated Jul. 24, 2015, issued in application No. 15151817.2-1860.
Chinese language office action dated Sep. 2, 2016, issued in application No. CN 201410786839.2.

* cited by examiner

OPTICAL TRANSMISSION DEVICE AND OPTICAL TRANSCEIVER MODULE

CROSS REFERENCE TO RELATED APPLICATIONS

This application claims the benefit of U.S. Provisional Application No. 61/930,596, filed on Jan. 23, 2014, the entirety of which is incorporated by reference herein.

This Application claims priority of Taiwan Patent Application No. 103142738, filed on Dec. 9, 2014, the entirety of which is incorporated by reference herein.

BACKGROUND OF THE INVENTION

Field of the Invention

The present invention relates to an optical transmission device, and in particular to an optical transmission device applied to universal serial bus.

Description of the Related Art

With the development of the optical transmission field, the optical fiber transmission has a developed superiority in terms of transmission speed, transmission distance, and the anti-interference ability. As a result, the optical transmission devices are now being applied more widely. Due to the superiority of the optical transmission field, there is more and more demand for connecting a host and a device to an optical transmission device, such that hosts and devices with traditional interfaces (such as a peripheral component interconnect express interface or a universal serial bus 3.0 interface) can perform optical fiber communication using the optical transmission device. In the optical transmission devices, the active optical cable (AOC) includes two electrical-to-optical/optical-to-electrical chips located on the host terminal and the device terminal. The host and the device can perform optical fiber communication through the active optical fiber without changing the hardware. The conventional active optical cable does not include a power management function. As a result, even when the USB link components enter a low power-consumption state, the chip using active optical cables can still operate in a high power-consumption state, causing unnecessary power consumption. Therefore, a new active optical cable and an optical transmission method are needed to solve such problems.

BRIEF SUMMARY OF THE INVENTION

An embodiment of an optical transmission device is provided. The optical transmission device is coupled between a first electronic device and a second electronic device, and includes a first optical transceiver module coupled to the first electronic device; a second optical transceiver module coupled to the second electronic device; and first and second optical fibers coupled between the first optical transceiver module and the second optical transceiver module. The second optical transceiver module periodically transmits an optical signal to the first optical transceiver module when the second electronic device is idle for a first predetermined period.

Another embodiment of the optical transceiver module is provided. The optical transceiver module includes an optical-to-electrical transformation path with an electrical signal transmitter; a conversion module driving the electrical signal transmitter to transmit an electrical signal via an electrical signal transmission terminal according to an optical signal received in the optical-to-electrical transformation path; and a control unit turning off power of the conversion module when no optical signal is received in the optical-to-electrical transformation path for a first predetermined period.

Another embodiment of the optical transceiver module is provided. The optical transceiver module includes an electrical-to-optical transform path with an optical signal transmitter; a driving module driving the optical signal transmitter to transmit an optical signal via an optical signal transmission terminal according to an electrical signal received in the electrical-to-optical transformation path; and an idle signal detection unit, outputting an idle detection signal to a control unit according to an idle signal received in the electrical-to-optical transformation path.

Another embodiment of the optical transceiver module is provided. The optical transceiver module has an optical receiving terminal, an optical transmission terminal, an electrical signal receiving terminal, and an electrical signal transmission terminal. The optical transceiver module further includes an optical detection unit coupled to the optical receiving terminal; an electrical signal transmitter coupled to the electrical signal transmission terminal; a conversion module coupled between the optical receiving terminal and the electrical signal transmitter; an optical signal transmitter coupled to the optical signal transmission terminal; a driving module coupled between the electrical signal receiving terminal and the optical signal transmitter; an idle detection unit coupled to the electrical signal receiving terminal; and a control unit coupled to the optical detection unit, the conversion module, the driving module, and the idle detection unit.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated operation of carrying out the invention. This description is made for the purpose of illustrating the general principles of the invention and should not be taken in a limiting sense. Certain terms and figures are used throughout the description and following claims to refer to particular components. As one skilled in the art will appreciate, manufacturers may refer to a component by different names. This document does not intend to distinguish between components that differ in name but not function. The terms "component", "system" and "device" used in the present invention could be the entity relating to the computer which is hardware, software, or a combination of hardware and software. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
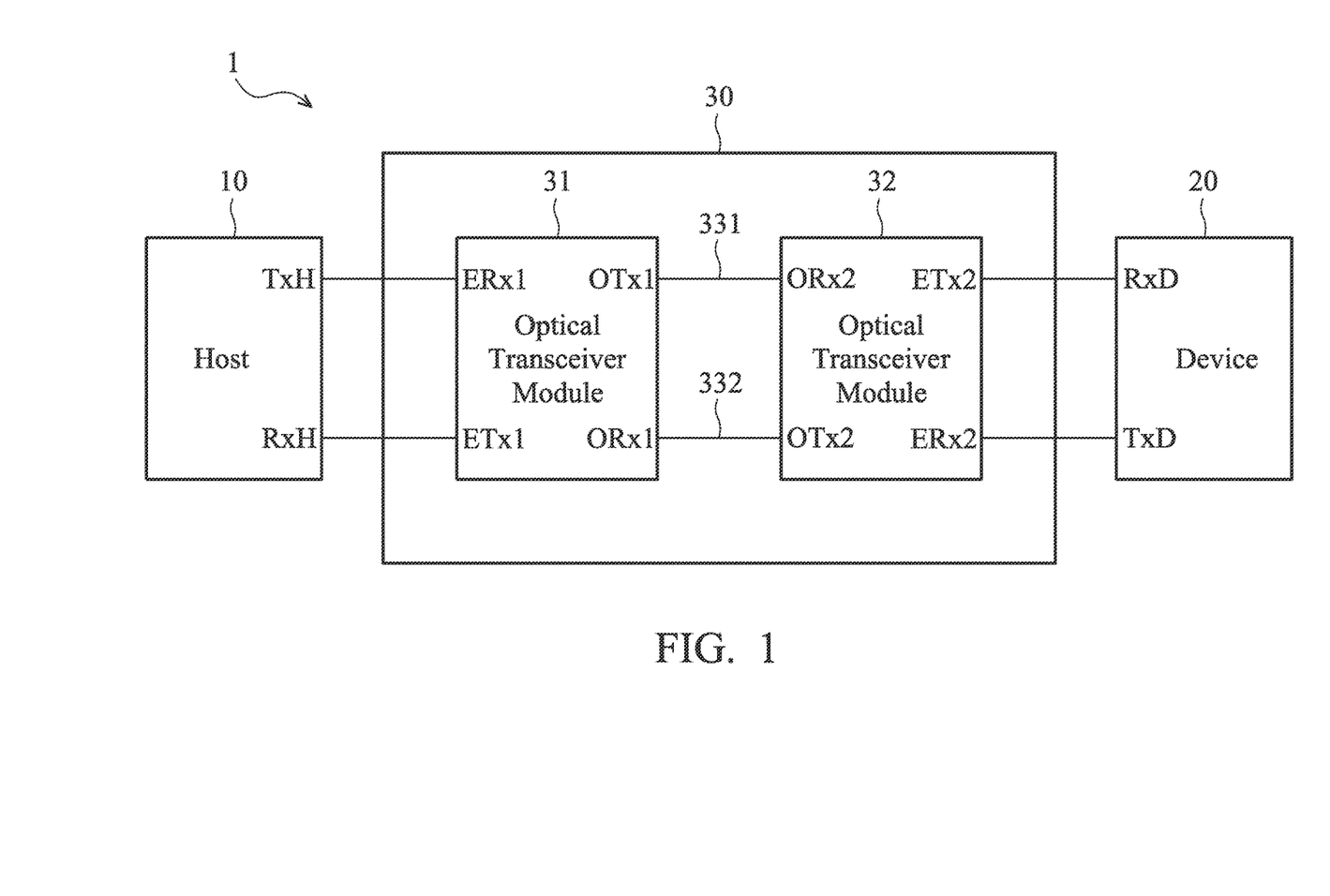
FIG. 1 is a schematic diagram of an optical transmission system according to an embodiment of the present invention.

FIG. 1 is a schematic diagram of an optical transmission system 1 according to an embodiment of the present invention. The optical transmission system 1 includes a host 10, a device 20, and an optical transmission device 30 connected between the host 10 and the device 20. The host 10 may be a high-speed electronic transceiver device having a PCIE interface or a USB3.0 interface or supporting hot-plugging function, and includes a transmission terminal TxH and a receiving terminal RxH. The device 20 can be a high-speed electronic connection device having a PCIE interface or a USB3.0 interface or supporting hot-plugging function, and includes a transmission terminal TxD and a receiving terminal RxD. The optical transmission device 30 can be an active optical cable, performing the electrical-to-optical/optical-to-electrical transformation and optical fiber communication between the host 10 and the device 20.

The optical transmission device 30 includes an optical transceiver module 31 coupled to the host 10 and an optical transceiver module 32 coupled to the device 20. The optical transmission device 30 further includes optical fibers 331 and 332 coupled between the optical transceiver modules 31 and 32. The optical transceiver module 31 includes an electrical signal transmission terminal ETx1 and an electrical signal receiving terminal ERx1 for transmitting and receiving an electrical signal. The optical transceiver module 31 further includes an optical signal transmission terminal OTx1 and an optical signal receiving terminal ORx1 for transmitting and receiving an optical signal. The optical transceiver module 32 includes an electrical signal transmission terminal ETx2 and an electrical signal receiving terminal ERx2 for transmitting and receiving an electrical signal. The optical transceiver module 32 further includes an optical signal transmission terminal OTx2 and an optical signal receiving terminal ORx2 for transmitting and receiving an optical signal. The electrical signal receiving terminal ERx1 in the optical transceiver module 31 is coupled to the transmission terminal TxH of the host 10 by a cable for receiving the electrical signal transmitted by the host 10. The optical transceiver module 31 performs an electrical-to-optical transformation on the electrical signal received by electrical signal receiving terminal ERx1 to obtain an optical signal, and transmits the obtained optical signal from the optical signal transmission terminal OTx1 to the optical signal receiving terminal ORx2 by the optical fiber 331. The optical transceiver module 32 performs an optical-to-electrical transformation on the optical signal received by the optical signal receiving terminal ORx2 to obtain an electrical signal, and transmits the obtained electrical signal from the electrical signal transmission terminal ETx2 to the receiving terminal RxD of the device 20 by the cable. The electrical signal receiving terminal ERx2 is coupled to the transmission terminal TxD of the device 20 by the cable to receive the electrical signal transmitted by the device 20. The optical transceiver module 32 performs an electrical-to-optical transformation on the electrical signal received by the electrical signal receiving terminal ERx2 to obtain an optical signal, and transmits the obtained optical signal from optical signal transmission terminal OTx2 to optical signal receiving terminal ORx1 by the optical fiber 332. The optical transceiver module 31 performs an optical-to-electrical transformation on the optical signal received by the optical signal receiving terminal ORx1 to obtain an electrical signal, and transmits the obtained electrical signal from an electrical signal transmission terminal ETx1 to a receiving terminal RxH of the host 10 by the cable.

Figure 2:
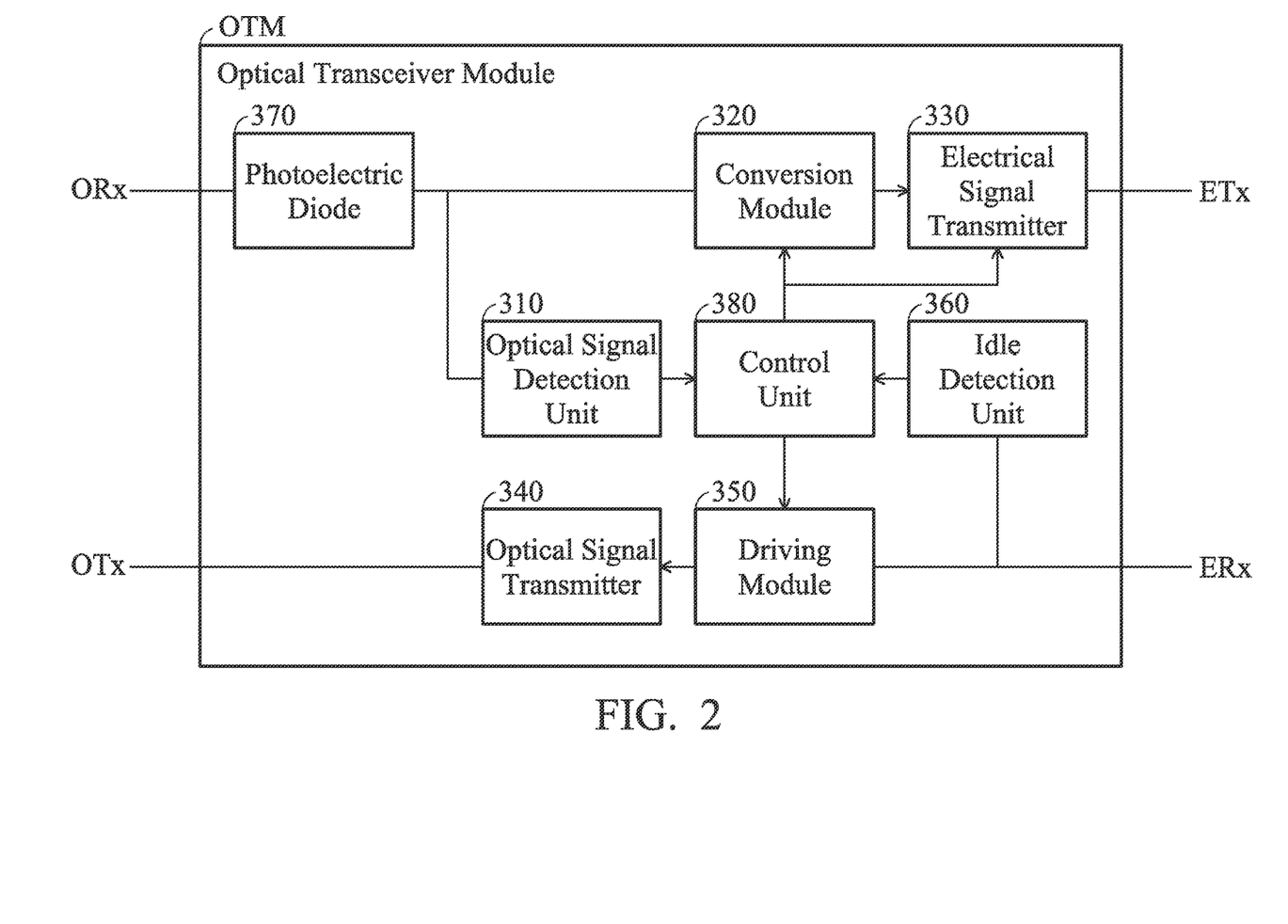
FIG. 2 is a schematic diagram of an optical transceiver module according to an embodiment of the present invention.

FIG. 2 is a schematic diagram of an optical transceiver module OTM according to an embodiment of the present invention. As shown in FIG. 2, a photoelectric diode 370 is coupled to an optical signal receiving terminal ORx, and an electrical signal transmitter 330 is coupled to the electrical signal transmission terminal ETx, and a conversion module 320 is coupled between the photoelectric diode 370 and the electrical signal transmitter 330. An optical signal transmitter 340 is coupled between an optical signal transmission terminal OTx and a driving module 350. The driving module 350 is coupled between the optical signal transmitter 340 and an electrical signal receiving terminal ERx. An optical signal detection unit 310 is coupled between the photoelectric diode 370 and a control unit 380. An idle detection unit 360 is coupled between an electrical signal receiving terminal ERx and the control unit 380. The control unit 380 is further coupled to the conversion module 320, the driving module 350, and the electrical signal transmitter 330. The control unit 380 controls the conversion module 320, the driving module 350, and the electrical signal transmitter 330 according to detection signals of the optical signal detection unit 310 and the idle detection unit 360. The optical transceiver module OTM is coupled to an electronic device (not shown in figure) by the electrical signal transmission terminal ETx and the electrical signal receiving terminal ERx. The optical transceiver module OTM can be the optical transceiver module 31 or the optical transceiver module 32 shown in FIG. 1. The optical transceiver module OTM has an electrical-to-optical transformation path for transforming an electrical signal to an optical signal. The electrical-to-optical transformation path includes the driving module 350 and the optical signal transmitter 340 at least. According to the received electrical signal, the driving module 350 draws a current and the optical signal transmitter 340 is driven to perform the optical signal transmission based on the current drawn by the driving module 350. In one embodiment, the optical signal transmitter 340 can be a vertical-cavity surface-emitting laser. The optical transceiver module OTM further has the control unit 380 and the idle detection unit 360. The idle detection unit 360 is coupled between the electrical signal receiving terminal ERx and the control unit 380. In the electrical-to-optical transformation path, the idle detection unit 360 detects whether the electrical device is idle according to the received signal received by the electrical signal receiving terminal ERx. The control unit 380 turns on and off power of the driving module 350 periodically when the electrical device is idle for a first predetermined period. Correspondingly, the optical signal transmitter 340 also transmits the optical signal periodically to save power.

The optical transceiver module OTM also has an optical-to-electrical transformation path for transforming an optical signal to an electrical signal. The optical-to-electrical transformation path at least includes the photoelectric diode 370, the conversion module 320, and the electrical signal transmitter 330. The photoelectric diode 370 transforms the received optical signal to a current, and the conversion module 320 transforms the current to a voltage, and the electrical signal transmitter 330 pre-drives the voltage and then performs transmission of the pre-driven voltage. In one embodiment, the electrical signal transmitter 330 also has a buffer function. The optical transceiver module OTM also has the optical signal detection unit 310. The optical signal detection unit 310 is coupled between the photoelectric diode 370 and the control unit 380. In the optical-to-electrical transformation path, the optical signal detection unit 310 detects the current output from the photoelectric diode 370 to determine whether the optical signal is received, and the control unit 380 turns off power of the conversion module 320 when the optical signal detection unit 310 does not receive any optical signal for a second predetermined period. Correspondingly, the electrical signal transmitter 330 also stops transmitting the electrical signal for power saving. In one embodiment, the power of the electrical signal transmitter 330 can also be turned off by the control unit 380.

Figure 3:
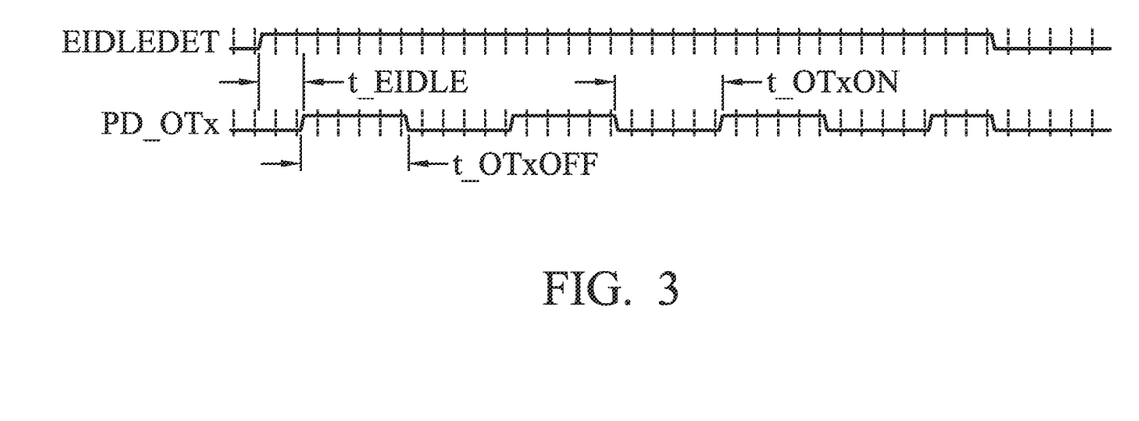
FIG. 3 is a signal timing diagram of the optical transceiver module according to an embodiment of the present invention.

In one embodiment, an electrical signal transmission terminal ETx is coupled to a receiving terminal of the electronic device, and an electrical signal receiving terminal ERx is coupled to a transmission terminal of the electronic device. The optical transceiver module OTM has corresponding operations in response to the power management of the electronic device. The electronic device transmits a corresponding electrical idle signal to the electrical signal receiving terminal ERx when the electronic device enters the low power-consumption state and is idle. The following embodiment is illustrated by taking FIG. 3 for example. FIG. 3 is a signal timing diagram of the optical transceiver module OTM according to an embodiment of the present invention. In FIG. 3, EIDLEDET is an idle detection signal which represents the idle detection unit 360 detects that the coupled electronic device enters an idle state. The idle detection signal EIDLEDET is logic 1 when the coupled electronic device is idle. In FIG. 3, PD_OTx represents a turn-off signal of the optical signal transmission terminal that is transmitted by the control unit 380. When the turn-off signal PD_OTx of the optical signal transmission terminal is logic 1, power of the driving module 350 is turned off. Namely, the driving module 350 stops drawing the current from the received electrical signal received by the electrical signal receiving terminal ERx, and thus, the optical signal transmitter 340 stops transmitting the optical signal to the optical signal transmission terminal OTx. When the turn-off signal PD_OTx of the optical signal transmission terminal is logic 0, power of the driving module 350 is turned on. Namely, the driving module 350 draws the current from the received electrical signal received by the electrical signal receiving terminal ERx, and drives the optical signal transmitter 340 to transmit the optical signal by the optical signal transmission terminal OTx. As shown in FIG. 3, the control unit 380 turns on and off the power of the driving module 350 periodically when the electronic device is idle for a period t_EIDLE. As a result, the optical signal transmitter 340 also transmits the optical signal periodically. The turn-off period of the driving module 350 is t_OTxOFF, and the turn-on period of the driving module 350 is t_OTxON. Once the electronic device is no longer idle (i.e., the idle detection signal EIDLEDET is logic 0), the control unit 380 turns on the power of the driving module 350 (i.e., the turn-off signal PD_OTx of the optical signal transmission terminal is logic 0) accordingly. In one embodiment, if the optical signal receiving terminal of another optical transceiver module (not shown) coupled to the optical transceiver module OTM does not receive any optical signal for a predetermined unplugging period, the other optical transceiver module determines that the electronic device is already unplugged. As a result, the turn-off period t_OTxOFF of the driving module 350 must be less than the predetermined unplugging period to avoid misjudging that the electronic device is unplugged, even when it is actually idle. In the present specification, the optical signal transmitter can be a vertical-cavity surface-emitting laser.

Figure 4:
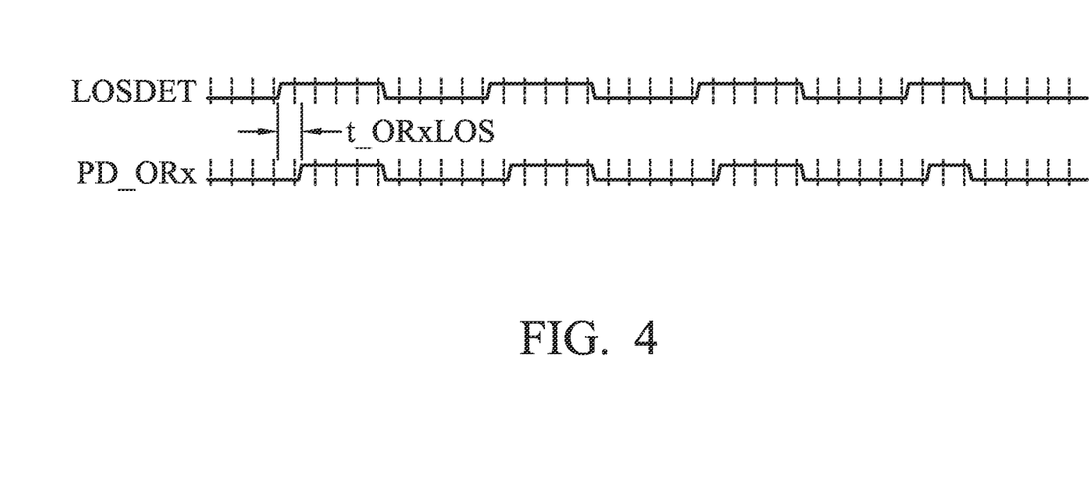
FIG. 4 is a signal timing diagram of the optical transceiver module according to an embodiment of the present invention.

The following embodiment is illustrated in FIG. 4. FIG. 4 is a signal timing diagram of the optical transceiver module OTM according to an embodiment of the present invention. In FIG. 4, LOSDET represents a detection signal of the optical signal which is transmitted by the optical signal detection unit 310. The detection signal LOSDET of the optical signal is logic 1 when the optical signal detection unit 310 determines that the optical signal receiving terminal ORx does not receive any optical signals. The detection signal LOSDET of the optical signal is logic 0 when the optical signal receiving terminal ORx receives optical signals. In FIG. 4, PD_ORx represents a turn-off signal of the optical signal receiving terminal that is transmitted by the control unit 380. When the turn-off signal PD_ORx of the optical signal receiving terminal is logic 1, the power of the conversion module 320 is turned off. Namely, the conversion module 320 stops converting the current to the voltage. As a result, the electrical signal transmitter 330 stops transmitting the electrical signal to the electrical signal transmission terminal ETx. In one embodiment, the power of the electrical signal transmitter 330 can be further turned off. When the turn-off signal PD_ORx of the optical signal receiving terminal is logic 0, the power of the conversion module 320 is turned on. Namely, the conversion module 320 converts the current to the voltage, and drives the electrical signal transmitter 330 to transmit the electrical signal via the electrical signal transmission terminal ETx. As shown in FIG. 4, when the optical signal detection unit 310 determines that no optical signal is received for the period t_ORxLOS, the control unit 380 turns off the power of the conversion module 320, such that the electrical signal is stop transmitting via the electrical signal transmission terminal ETx. Once the optical signal detection unit 310 receives the optical signal (i.e., the detection signal LOSDET of the optical signal is logic 0), the control unit 380 turns on the power of the conversion module 320 (i.e., the turn-off signal PD_ORx of the optical signal receiving terminal is logic 0).

Figure 5:
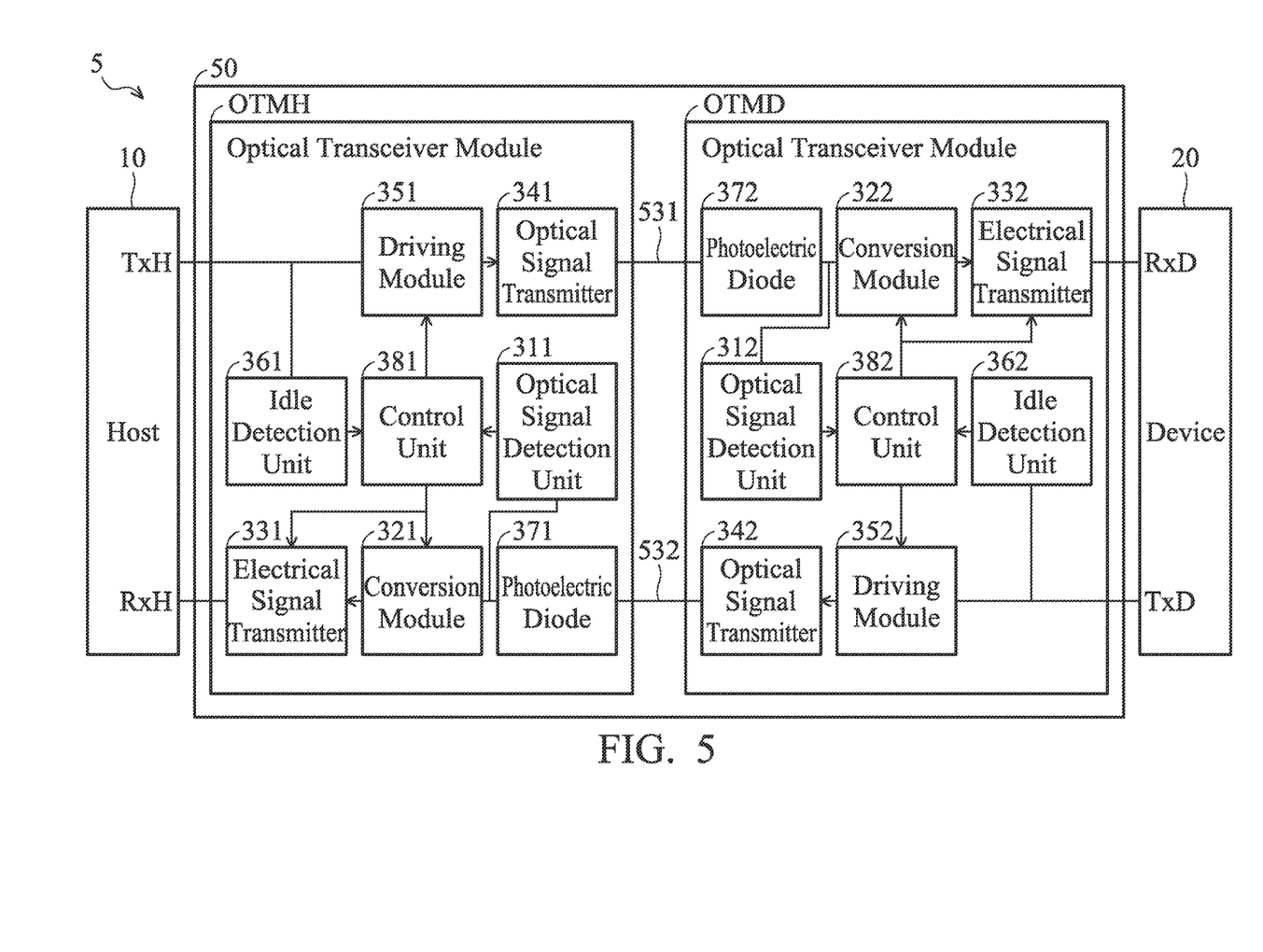
FIG. 5 is a schematic diagram of an optical transmission system according to an embodiment of the present invention.

FIG. 5 is a schematic diagram of an optical transmission system 5 according to an embodiment of the present invention. The optical transmission system 5 includes a host 10, a device 20, and an optical transmission device 50 connected between the host 10 and the device 20. The host 10 and the device 20 are similar to those shown in FIG. 1. The detailed descriptions of the same elements can be referred to in the earlier descriptions and will not be described again here. The optical transmission device 50 includes a host optical transceiver module OTMH coupled to the host 10 and a device optical transceiver module OTMD coupled to the device 20. The optical transmission device 50 further includes optical fibers 531 and 532 coupled between the host optical transceiver module OTMH and the device optical transceiver module OTMD. The host optical transceiver module OTMH includes an optical detection unit 311, a conversion module 321, an electrical signal transmitter 331, an optical signal transmitter 341, a driving module 351, an idle detection unit 361, a photoelectric diode 371, and a control unit 381. The host optical transceiver module OTMH is coupled to the host 10 by the electrical signal transmission terminal ETx1 and the electrical signal receiving terminal ERx1, and is coupled to the optical fibers 531 and 532 by the optical signal transmission terminal OTx1 and the optical signal receiving terminal ORx1, respectively. The photoelectric diode 371 is coupled to the device optical transceiver module OTMD by the optical signal receiving terminal ORx1. The optical detection unit 311 is coupled between the photoelectric diode 371 and the control unit 381. The electrical signal transmitter 331 is coupled to the host 10 by the electrical signal transmission terminal ETx1. The conversion module 321 is coupled between the photoelectric diode 371 and the electrical signal transmitter 331. The optical signal transmitter 341 is coupled to the device optical transceiver module OTMD by the optical signal transmission terminal OTx1. The idle detection unit 361 and the driving module 351 are coupled to the host 10 by the electrical signal receiving terminal ERx1. The optical signal transmitter 341 is coupled between the driving module 351 and the optical signal transmission terminal OTx1. The idle detection unit 361 is coupled between the electrical signal receiving terminal ERx1 and the control unit 381. The control unit 381 is further coupled to the conversion module 321, the driving module 351, and the electrical signal transmitter 331. The control unit 381 controls the conversion module 321, the driving module 351, and the electrical signal transmitter 331 according to the detected signals from the optical signal detection unit 311 and the idle detection unit 361.

The device optical transceiver module OTMD includes an optical signal detection unit 312, a conversion module 322, an electrical signal transmitter 332, an optical signal transmitter 342, a driving module 352, an idle detection unit 362, a photoelectric diode 372, and a control unit 382. The device optical transceiver module OTMD is coupled to the device 20 by the electrical signal transmission terminal ETx2 and the electrical signal receiving terminal ERx2, and is coupled to the optical fibers 531 and 532 by optical signal receiving terminal ORx2 and the optical signal transmission terminal OTx2, respectively. The photoelectric diode 372 is coupled to the host optical transceiver module OTMH by the optical signal receiving terminal ORx2. The optical detection unit 312 is coupled between the photoelectric diode 372 and the control unit 382. The electrical signal transmitter 332 is coupled to the device 20 by the electrical signal transmission terminal ETx2. The conversion module 322 is coupled between the photoelectric diode 372 and the electrical signal transmitter 332. The optical signal transmitter 342 is coupled to the host optical transceiver module OTMH by the optical signal transmission terminal OTx2. The idle detection unit 362 and the driving module 352 are coupled to the device 20 by the electrical signal receiving terminal ERx2. The optical signal transmitter 342 is coupled between the driving module 352 and the optical signal transmission terminal OTx2. The idle detection unit 362 is coupled between the electrical signal receiving terminal ERx2 and the control unit 382. The control unit 382 is further coupled to the conversion module 322, the driving module 352, and the electrical signal transmitter 332. The control unit 382 controls the conversion module 322, the driving module 352, and the electrical signal transmitter 332 according to the detected signals from the optical signal detection unit 312 and the idle detection unit 362. The optical signal detection units 311 and 312 are similar to the optical signal detection unit 310 in FIG. 2. The conversion modules 321 and 322 are similar to the conversion module 320 in FIG. 2. The electrical signal transmitters 331 and 332 are similar to the electrical signal transmitter 330 in FIG. 2. The optical signal transmitters 341 and 342 are similar to the optical signal transmitter 340 in FIG. 2. The driving modules 351 and 352 are similar to the driving module 350 in FIG. 2. The idle detection units 361 and 362 are similar to the idle detection unit 360 in FIG. 2. The photoelectric diode 371 and 372 are similar to the photoelectric diode 370 in FIG. 2. The control units 381 and 382 are similar to the control unit 380 in FIG. 2. The detailed descriptions of the same elements can be referred to in the earlier descriptions and will not be described again here. In some embodiments, the host optical transceiver module OTMH and the device optical transceiver module OTMD can be regarded as the optical transceiver modules 31 and 32 in FIG. 1. As a result, the optical signal transmission terminal OTx1, the optical signal receiving terminal ORx1, the electrical signal transmission terminal ETx1, and the electrical signal receiving terminal ERx1 in the host optical transceiver module OTMH can be regarded as the host optical transmission terminal, the host optical receiving terminal, the host electrical transmission terminal, and the host electrical receiving terminal. On the other hand, the optical signal transmission terminal OTx2, the optical signal receiving terminal ORx2, the electrical signal transmission terminal ETx2, and the electrical signal receiving terminal ERx2 in the device optical transceiver module OTMD can be regarded as the device optical transmission terminal, the device optical receiving terminal, the device electrical transmission terminal, and the device electrical receiving terminal.

According to the definition of the USB 3.0 specification, there are four link states U0, U1, U2, and U3. The link state U0 is a super speed connection effective state. The device transmits signals in the link state U0. The link states U1, U2, and U3 are power saving states, or low power link states. In the following description, D_SM is a device state machine signal for representing the link state which the device 20 is operating in. D_Tx is a device transmission terminal signal for representing the transmission signal of the transmission terminal TxD in the device 20. In the link state U0, device 20 transmits data of 5 GT/s which is composed by a series of logic 1 and logic 0 via the transmission terminal TxD. In the link state U1, device 20 transmits a signal every predetermined period (ex: 200 ms) via the transmission terminal TxD. In the link states U2 and U3, device 20 continues to transmit a common mode signal EIDLE representing that the device 20 is in idle state via the transmission terminal TxD. D_EIDLEDET is an idle detection signal of the device. The idle detection signal D_EIDLEDET of the device is logic 1 when the device 20 is idle. D_PD_OTx is a turn-off signal of the device optical transmission terminal. Power of the driving device 352 is turned off when the turn-off signal D_PD_OTx of the device optical transmission terminal is logic 1. Power of the driving device 352 is turned on when the turn-off signal D_PD_OTx of the device optical transmission terminal is logic 0. H_LOSDET is a detection signal of the host optical receiving terminal. The detection signal H_LOSDET of the host optical receiving terminal is logic 1 when the optical signal detection 311 detects that no optical signal is received via the host optical receiving terminal (ORx1). The detection signal H_LOSDET of the host optical receiving terminal is logic 0 when the optical signal detection unit 311 detects that an optical signal is received via the host optical receiving terminal (ORx1). H_PD_ORx is a turn-off signal of the host optical receiving terminal. Power of the conversion module 321 is turned off when the turn off signal H_PD_ORx of the host optical receiving terminal is logic 1. Power of the conversion module 321 is turned on when the turn off signal H_PD_ORx of the host optical receiving terminal is logic 0. H_EIDLEDET is a host idle detection signal. The host 10 is idle when the host idle detection signal H_EIDLEDET is logic 1. H_ORxR is a register signal of a host optical receiving terminal, and the register signal represents data stored in a register in the host optical transceiver module OTMH. Data stored in the register in the host optical transceiver module OTMH is reset to logic 0 when the host idle detection signal H_EIDLEDET changes from logic 1 to logic 0. Data stored in the register in the host optical transceiver module OTMH is set to logic 1 when the turn-off signal H_PD_ORx of the host optical receiving terminal is logic 1. H_PD_OTx is a turn-off signal of the host optical transmission terminal. Power of the driving module 351 is turned off when the turn-off signal H_PD_OTx of the host optical transmission terminal is logic 1. Power of the driving module 351 is turned on when the turn-off signal H_PD_OTx of the host optical transmission terminal is logic 0. D_LOSDET is a detection signal of the device optical receiving terminal. The detection signal D_LOSDET of the device optical receiving terminal is logic 1 when the optical signal detection unit 312 detects that no optical signal is received via the device optical receiving terminal (ORx2). The detection signal D_LOSDET of the device optical receiving terminal is logic 0 when the optical signal detection unit 312 detects that an optical signal is received via the device optical receiving terminal (ORx2). D_PD_ORx is a turn-off signal of the device optical receiving terminal. Power of the conversion module 322 is turned off when the turn-off signal D_PD_ORx of the device optical receiving terminal is logic 1. Power of the conversion module 322 is turned on when the turn-off signal D_PD_ORx of the device optical receiving terminal is logic 0.

Figure 6:
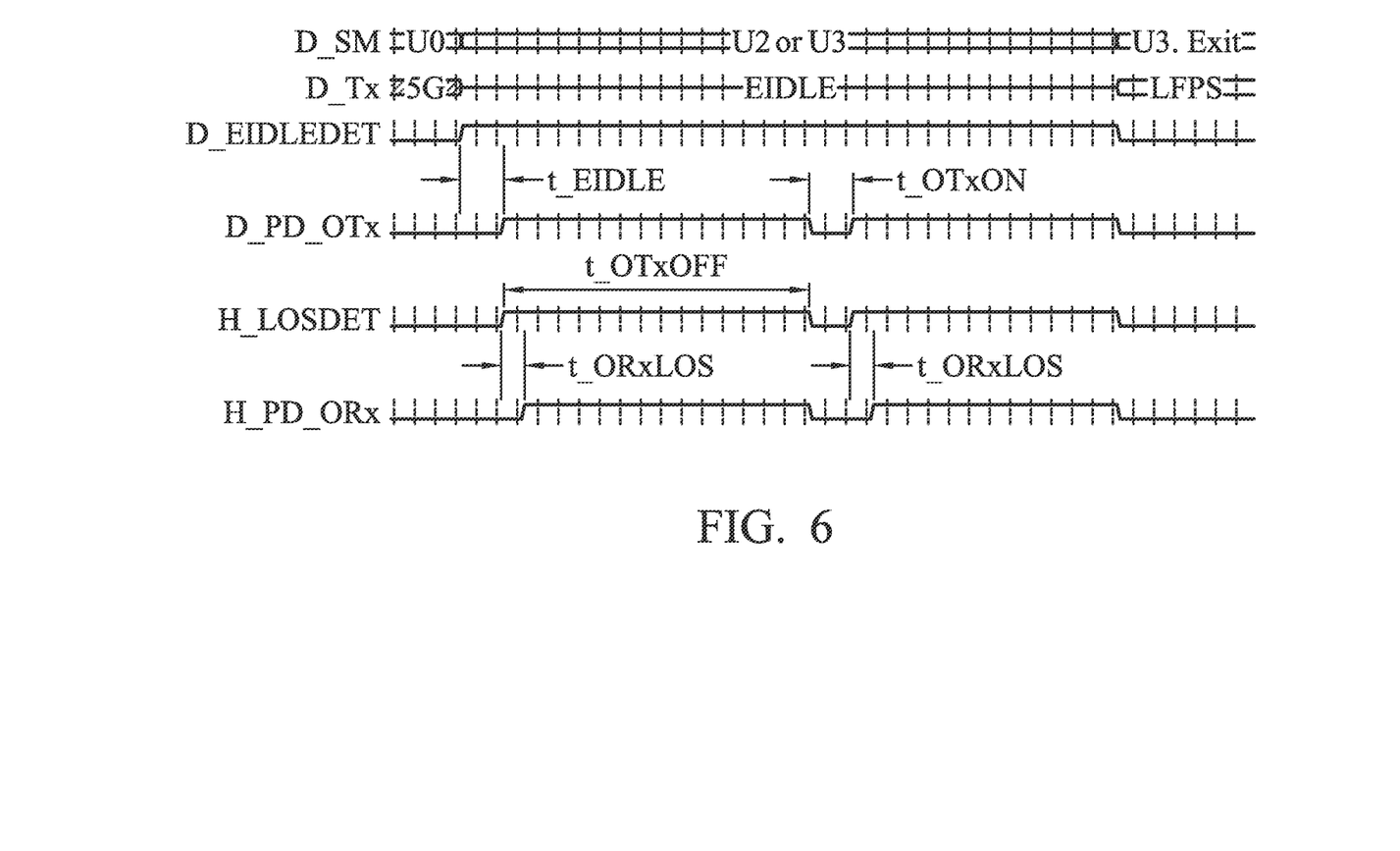
FIG. 6 is a signal timing diagram of the optical transmission system when the device operates in the link state U2 or U3 according to an embodiment of the present invention.

FIG. 6 is a signal timing diagram of the optical transmission system 5 when the device 20 operates in the link state U2 or U3 according to an embodiment of the present invention. As shown in FIG. 6, the transmission terminal TxD transmits the common mode signal EIDLE such that the idle detection unit 362 detects that the device 20 is in the idle state when the device 20 operates in the link state U2 or U3. When the device 20 is idle for a period t_EIDLE, the control unit 382 turns on and off the power of the driving module 352 periodically. Namely, the optical signal is transmitted periodically via the device optical transmission terminal (OTx2). t_OTxOFF is a period during which power to the driving module 352 is turned off (i.e., a period during which no optical signal is transmitted via the device optical transmission terminal). t_OTxON is a period during which power to the driving module 352 is turned on (i.e., a period during which an optical signal is transmitted via the device optical transmission terminal). Once the device 20 is no longer idle, the control unit 382 turns on the power of the driving module 352. When no optical signal is received via the host optical receiving terminal (ORx1) for the period t_ORxLOS, the control unit 381 turns off the power of the conversion module 321 (i.e., H_PD_ORx is logic 1). Namely, the electrical signal is stopped transmitting via the host electrical transmission terminal (ETx1). Once the optical signal is received via the host optical receiving terminal (ORx1), the control unit 381 turns on power of the conversion module 321 (i.e., H_PD_ORx is logic 0).

Figure 7:
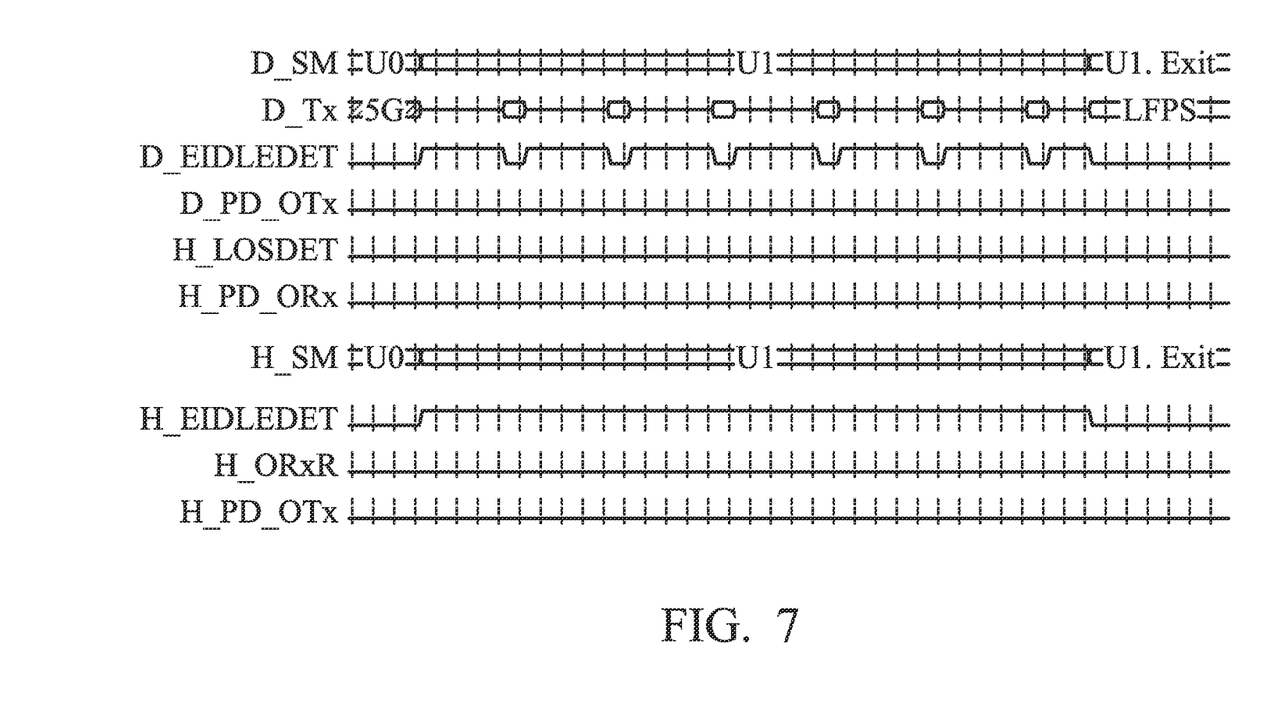
FIG. 7 is a signal timing diagram of the optical transmission system when the device operates in the link state U1 according to an embodiment of the present invention.

FIG. 7 is a signal timing diagram of the optical transmission system 5 when the device 20 operates in the link state U1 according to an embodiment of the present invention. As shown in FIG. 7, the device 20 transmits a signal D_Tx every specific period (such as t_Ping) via the transmission terminal TxD when the device 20 operates in the link state U1. Power of the driving module 352 can be maintained at turn-on (i.e., D_PD_OTx is logic 0) in the link state U1 by setting the period t_EDILE to be larger than the specific period t_Ping.

Figure 8:
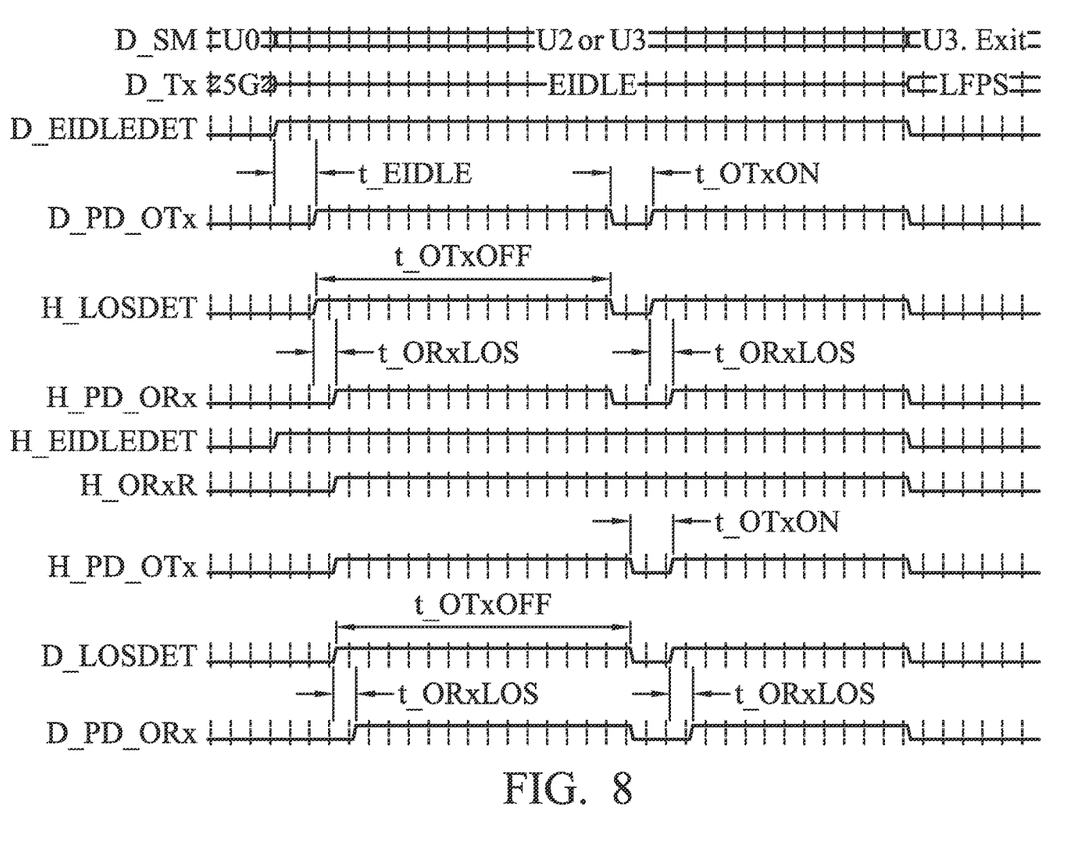
FIG. 8 is a signal timing diagram of the optical transmission system when the device operates in the link state U2 or U3 according to an embodiment of the present invention.

FIG. 8 is a signal timing diagram of the optical transmission system 5 when device 20 operates in the link state U2 or U3 according to an embodiment of the present invention. As shown in FIG. 8, when the device 20 is in the link state U2 or U3, the device 20 transmits the common mode signal EIDLE via the transmission terminal TxD such that the idle detection unit 362 detects that the device 20 is idle. The upper part of FIG. 8 is same as that shown in FIG. 6. The detailed descriptions of the same elements can be referred to in the earlier descriptions and will not be described again here. The following embodiment is illustrated according to the lower part of FIG. 8. When the host 10 is idle (i.e., H_EIDLEDET is logic 1) for the period t_EIDLE and no optical signal is received via the host optical receiving terminal (ORx1) for the period t_ORxLOS, power of the driving module 351 is turned on and off periodically. Namely, the optical signal is transmitted periodically via the host terminal optical transmission terminal. t_OTxOFF is a period that power of the driving module 351 is turned off (i.e., a period that no optical signal is transmitted via the host optical transmission terminal). t_OTxON is a period that power of the driving module 351 is turned on (i.e., a period that an optical signal is transmitted via the host optical transmission terminal). Once the host 10 is no longer idle, power of the driving module 351 is turned on accordingly. In link state U1, host 10 does not transmit the signal every specific period like the device 20 does, so that the host optical transceiver module OTMH cannot distinguish the link states U1, U2, and U3 based solely on whether the host 10 is idle for the period t_EIDLE. The host optical transceiver module OTMH can determine whether the device 20 operates in the link state U2 or U3 indirectly based on whether no optical signal is received via the host optical receiving terminal (ORx1) for the period t_ORxLOS. Whether no optical signal is received via the host optical receiving terminal (ORx1) for the period t_ORxLOS can be recorded by setting the register in the host optical transceiver module OTMH. As a result, unlike turning on and off the power of the driving module 352 periodically based on a single condition (i.e., the device 20 is idle for the period t_EIDLE), the power of the driving module 351 is turned on and off periodically when the host 10 is idle for the period t_EIDLE and no optical signal is received via the host optical receiving terminal (ORx1) for the period t_ORxLOS. In one embodiment, the power of the driving module 351 is turned on and off periodically when the host 10 is idle for the period t_EIDLE and the data of the register is set from a first logic level to a second logic level. When no optical signal is received via the device optical receiving terminal (ORx2) for the period t_ORxLOS, power of the conversion module 322 is turned off (D_PD_ORx is logic 1). Namely, the electrical signal stops transmitting via the device electrical transmission terminal (ETx2). Once an optical signal is received via the device optical receiving terminal (ORx2), power of the conversion module 322 is turned on (D_PD_ORx is logic 0) accordingly.

In one embodiment, because the host 10 performs receiver terminal detection every predetermined period (such as 100 ms) in the link state U2 or U3, the period t_EIDLE of the host optical transceiver module OTMH can be less than 100 ms or can be about 1ms.

As mentioned above, according to the above embodiments, the optical transmission devices of the present invention can perform corresponding power management operations for power saving based on the power management of the connected electronic device.

Though the host and the device mentioned in the specification support USB 3.0, a person having ordinary skill in the art can apply the host and the device in USB 3.1 or USB 3 series based on the optical transceiver module, the optical transmission device, and the optical transmission method as recited in the present specification.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical transceiver module, comprising:
    an electrical-to-optical transformation path, comprising:
        an optical signal transmitter;
        a driving module, driving the optical signal transmitter to transmit an optical signal via an optical signal transmission terminal according to an electrical signal received in the electrical-to-optical transformation path from an electrical device, the electrical signal being sent when the electrical device enters a low power-consumption state and is idle;
        an idle signal detection unit, detecting whether the electrical device is in an idle mode according to the electrical signal received in the electrical-to-optical transformation path, and outputting an idle detection signal according to an idle signal received in the electrical-to-optical transformation path; and
        a control unit configured to receive the idle detection signal and determine that the electrical device is idle, wherein the control unit turns on and off power of the driving module according to predetermined on and off periods when the control unit determines that the electrical device is idle for a first predetermined period.

2. The optical transceiver module as claimed in claim 1, wherein the control unit turns on and off power of the driving module periodically when the idle detection signal is received in the electrical-to-optical transformation path for the first predetermined period and no optical signal is received in an optical-to-electrical transformation path of the optical transceiver module for a second predetermined period.

3. The optical transceiver module as claimed in claim 1, further comprising a register, data of the register is set from a first logic level to a second logic level, when no optical signal is received in an optical-to-electrical transformation path of the optical transceiver module for a second predetermined period.

4. The optical transceiver module as claimed in claim 3, wherein the control unit turns on and off power of the driving module periodically when the idle detection signal is received in the electrical-to-optical transformation path for the first predetermined period and the data of the register is set to the second logic level from the first logic level.

5. An optical transceiver module, having an optical receiving terminal, an optical transmission terminal, an electrical signal receiving terminal, and an electrical signal transmission terminal, the optical transceiver module comprising:
    an optical detection unit, coupled to the optical receiving terminal;
    an electrical signal transmitter, coupled to the electrical signal transmission terminal;
    a conversion module, coupled between the optical receiving terminal and the electrical signal transmitter;
    an optical signal transmitter, coupled to the optical signal transmission terminal;
    a driving module, coupled between the electrical signal receiving terminal and the optical signal transmitter;
    an idle detection unit, coupled to the electrical signal receiving terminal, configured to detect whether an electrical device is in an idle mode according to the electrical signal received in the electrical-to-optical transformation path and generate an idle detection signal; and
    a control unit, coupled to the optical detection unit, the conversion module, the driving module, and the idle detection unit, wherein the control unit is configured to receive the idle detection signal and determine that the electrical device is idle, wherein the control unit turns on and off power of the driving module periodically when the control unit determines that the electrical device is idle for a first predetermined period, wherein the control unit turns off power to the driving module for a period less than an unplugging period, wherein the electrical device is determined to be unplugged when no optical signal is received for the unplugging period.

6. The optical transceiver module as claimed in claim 5, wherein the control unit turns on and off power of the driving module periodically when the idle detection unit detects that the idle signal is received via the electrical signal receiving terminal for the first predetermined period and the optical detection unit detects that no optical signal is received via the optical signal receiving terminal for a second predetermined period.

7. The optical transceiver module as claimed in claim 5, further comprising a register, wherein data of the register is set from a first logic level to a second logic level when the optical detection unit detects that no optical signal is received via the optical signal receiving terminal for a second predetermined period.

8. The optical transceiver module as claimed in claim 7, wherein the control unit turns on and off power of the driving module periodically when the idle detection unit detects that the idle signal is received via the electrical signal receiving terminal for the first predetermined period and the data of the register is set to the second logic level from the first logic level.

9. The optical transceiver module as claimed in claim 5, wherein the control unit turns off power of the conversion module when the optical detection unit detects that no optical signal is received via the optical signal receiving terminal for a second predetermined period.

10. The optical transceiver module as claimed in claim 9, wherein the control unit is further coupled to the electrical signal transmitter, and turns off power of the electrical signal transmitter when the optical detection unit detects that no optical signal is received via the optical signal receiving terminal for the second predetermined period.

11. The optical transceiver module as claimed in claim 5, further comprising a photoelectric diode coupled between the optical receiving terminal and the conversion module.

12. An optical transmission device, coupled between a first electronic device and a second electronic device, comprising:
a first optical transceiver module, coupled to the first electronic device;
a second optical transceiver module, coupled to the second electronic device; and
first and second optical fibers, coupled between the first optical transceiver module and the second optical transceiver module, wherein the second optical transceiver module transmits an optical signal to the first optical transceiver module periodically when the second electronic device is idle for a first predetermined period, wherein a period in which no optical signal is transmitted by the second optical transceiver is less than an unplugging period, wherein the second electronic device is determined to be unplugged when no optical signal is received for the unplugging period.

13. The optical transmission device as claimed in claim 12, wherein the first optical transceiver module transmits an optical signal to the second optical transceiver module periodically when the first electronic device is idle for a third predetermined period and the first optical transceiver module does not receive any optical signal from the second optical transceiver module for a second predetermined period.

14. The optical transmission device as claimed in claim 12, wherein data of a register of the first optical transceiver module is set from a first logic level to a second logic level when the first optical transceiver module does not receive any optical signal from the second optical transceiver module for a second predetermined period.

15. The optical transmission device as claimed in claim 14, wherein the first optical transceiver module transmits an optical signal to the second optical transceiver module periodically when the first electronic device is idle for a third predetermined period and the data of the register is set to the second logic level from the first logic level.

16. The optical transmission device as claimed in claim 12, wherein the second optical transceiver module stops transmitting an electrical signal to the second electronic device when the second optical transceiver module does not receive an optical signal from the first optical transceiver module for a second predetermined period.

17. The optical transmission device as claimed in claim 12, wherein the first optical transceiver module stops transmitting an electrical signal to the first electronic device when the first optical transceiver module does not receive any optical signal from the second optical transceiver module for a second predetermined period.

18. The optical transmission device as claimed in claim 12, wherein the second optical transceiver module comprises a driving module, wherein power of the driving module is turned on and off periodically when the second electronic device is idle for the first predetermined period.

19. The optical transmission device as claimed in claim 17, wherein the first optical transceiver module comprises a conversion module, wherein power of the conversion module is turned off when the first optical transceiver module does not receive any optical signal from the second optical transceiver module for the second predetermined period.

20. The optical transmission device as claimed in claim 13, wherein the first optical transceiver module comprises a driving module, and power of the driving module is turned on and off periodically when the first electronic device is idle for the third predetermined period and does not receive any optical signal from the second optical transceiver module for the second predetermined period.

21. The optical transmission device as claimed in claim 15, wherein the first optical transceiver module comprises a driving module, and power of the driving module turns on and off periodically when the first electronic device is idle for the third predetermined period and the data of the register is set to the second logic level from the first logic level.

22. The optical transmission device as claimed in claim 16, wherein the second optical transceiver module comprises a conversion module, and power of the conversion module is turned off when the second optical transceiver module does not receive any optical signal from the first optical transceiver module for the second predetermined period.

* * * * *